June 17, 1930.  A. R. RUTTER  1,764,351
ELECTRICAL MEASURING INSTRUMENT
Filed Aug. 20, 1924
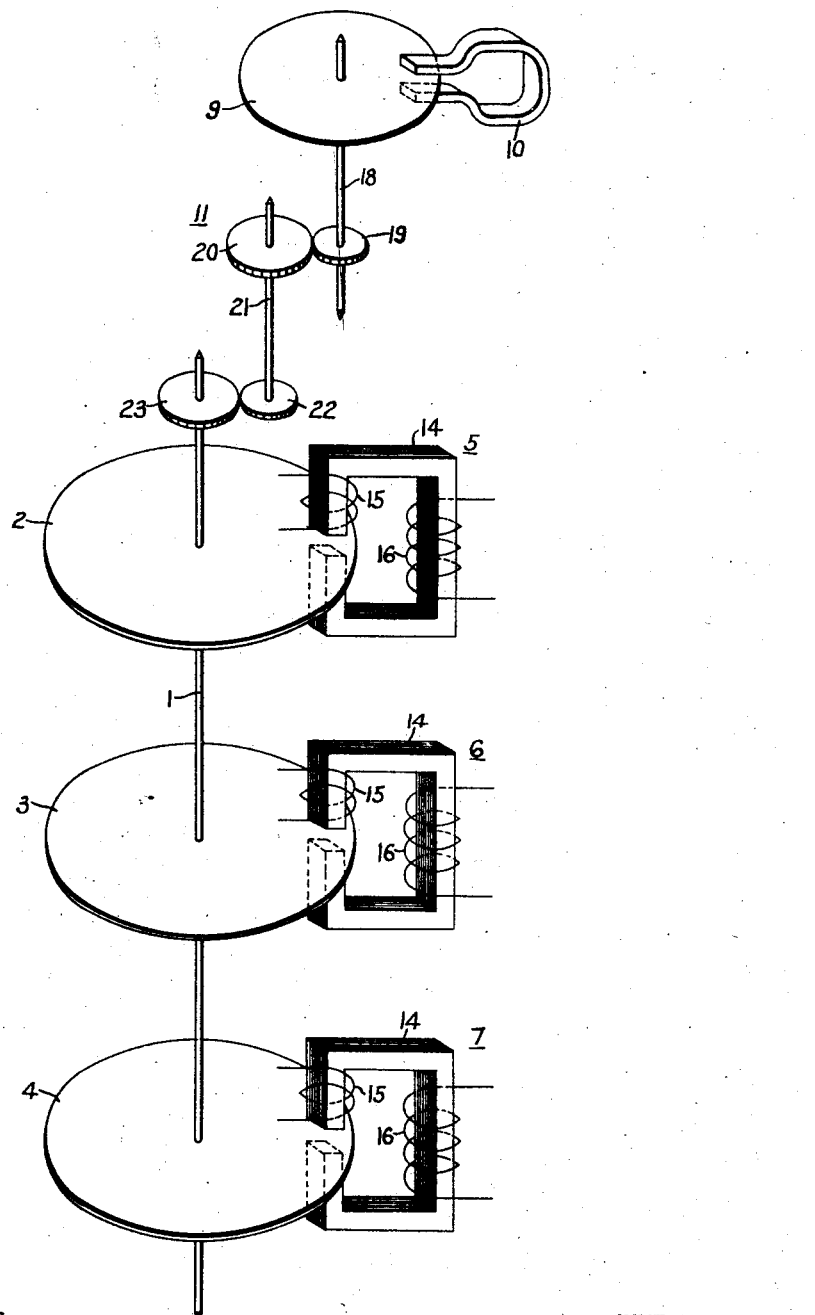
WITNESSES:
INVENTOR
Argyle R. Rutter.
BY
ATTORNEY Patented June 17, 1930

1,764,351

UNITED STATES PATENT OFFICE

ARGYLE R. RUTTER, OF EAST PITTSBURGH, PENNSYLVANIA, ASSIGNOR TO WESTINGHOUSE ELECTRIC & MANUFACTURING COMPANY, A CORPORATION OF PENNSYLVANIA

ELECTRICAL MEASURING INSTRUMENT

Application filed August 20, 1924. Serial No. 733,050.

My invention relates to electrical measuring instruments and particularly to polyphase induction watthour meters.

One object of my invention is to provide an instrument of the above indicated character that shall be free from certain errors heretofore existing in polyphase watthour meters of the induction type.

Another object of my invention is to provide a single damping means for all of the elements of a polyphase induction meter.

Another object of my invention is to provide a single damping means that shall be so geared to the simultaneously movable elements of a polyphase meter as to permit the full-load portion of the curve of each element to fall more nearly on the full-load portion of the composite curve of the meter.

A further object of my invention is to provide an instrument that shall be simple and durable in construction, economical to manufacture and effective in its operation.

In polyphase induction watthour meters employing a plurality of armature disks mounted on the same shaft and each provided with its own damping magnet, there is an inherent error caused by damping effects when only one or two elements are active. This error is caused by the absence of the series damping of the idle element or elements and is of such nature as to cause the active element or elements of the instrument to operate the register of the meter at a higher proportional speed than they do when all of the elements are active.

In practicing my invention, I omit the damping magnets from the several armature disks of a polyphase meter that are mounted on the same shaft and so connect a damped auxiliary armature disk to the shaft through a gear mechanism as to effectively damp all or any number of the disks. By this construction, the errors above referred to are eliminated and the instrument is caused to accurately measure the load irrespective of whether that load is of one, all or any other number of the circuits or circuit phases to which the several elements are connected.

The single figure of the accompanying drawing is a diagrammatic perspective view of a portion of a three-phase four-wire watthour meter embodying my invention.

The device comprises, in general, a shaft 1 on which armature disks 2, 3 and 4 are mounted, actuating field magnet structures 5, 6 and 7 for the disks 2, 3 and 4, respectively, an auxiliary armature disk 9, a damping magnet 10 therefor and a gear mechanism 11 connecting the disk 9 to the shaft 1. The shaft 1 may be connected to a usual integrating mechanism or register (not shown).

Each of the field-magnet structures 5, 6 and 7 comprises a laminated core member 14 on which are wound a series or current winding 15 and a shunt or voltage winding 16 for connection to the several phases of a polyphase circuit (not shown) in a usual and well-known manner.

The gear mechanism 11 comprises a shaft 18 on which the disk 9 and a gear wheel 19 are mounted. The gear wheel 19 engages a gear wheel 20 on a shaft 21 that also carries a gear wheel 22 for engagement with a gear wheel 23 on the shaft 1. The mechanism 11 is merely representative of any suitable mechanism which may be employed to cause the disk 9 to rotate at a higher speed than the shaft 1.

In the device of my invention, by reason of the fact that all of the armature disks are damped by the single damping magnet 10, through the gear mechanism 11 and the relatively high-speed disk 9, the load curve of each element is in such relation to the composite load curve of all of the elements as to fall more nearly on this curve, irrespective of how many of the elements are active. This effect is obtained by having a relatively low full-load speed for each meter element to substantially eliminate series damping.

While I have shown and described a particular form of my invention, changes may be made therein without departing from the spirit and scope thereof, as set forth in the appended claims.

I claim as my invention:

1. An induction meter comprising a shaft, a plurality of armatures thereon, an actuating electromagnet for each armature, an auxiliary armature relatively-movably connected to said shaft and a damping magnet for co-operation with said auxiliary armature.

2. An induction meter comprising a shaft, a plurality of armature disks thereon, an actuating electromagnet for each disk, an auxiliary armature disk, a gear mechanism connected between said shaft and said auxiliary disk, and a damping magnet for the auxiliary disk.

3. An induction meter comprising a shaft, a plurality of armatures thereon, an electromagnet for actuating each armature at a relatively slow speed, an auxiliary damping armature, a gear mechanism connecting the auxiliary armature to the shaft to actuate the auxiliary armature at a relatively high speed, and a damping magnet for the auxiliary armature.

4. A meter comprising a plurality of coacting armatures, means for actuating each of said armatures, an auxiliary armature for braking said coacting armatures, and means for rotating said auxiliary armature faster than said coacting armatures.

5. A meter comprising a plurality of mechanically connected armatures, means for actuating each of said armatures, means comprising an auxiliary armature for braking said armatures, and means for causing said auxiliary armature to rotate at a greater speed than said first named armatures.

In testimony whereof, I have hereunto subscribed my name this 18th day of August, 1924.

ARGYLE R. RUTTER.